July 15, 1969   L JACK WILLIAMS ET AL   3,455,330
SINGLE-STAGE PROPORTIONAL CONTROL SERVOVALVE
Filed May 10, 1966

INVENTORS
L Jack Williams
William J. Thayer
Kenneth D. Garnjost
BY Popp and Sommer
ATTORNEYS

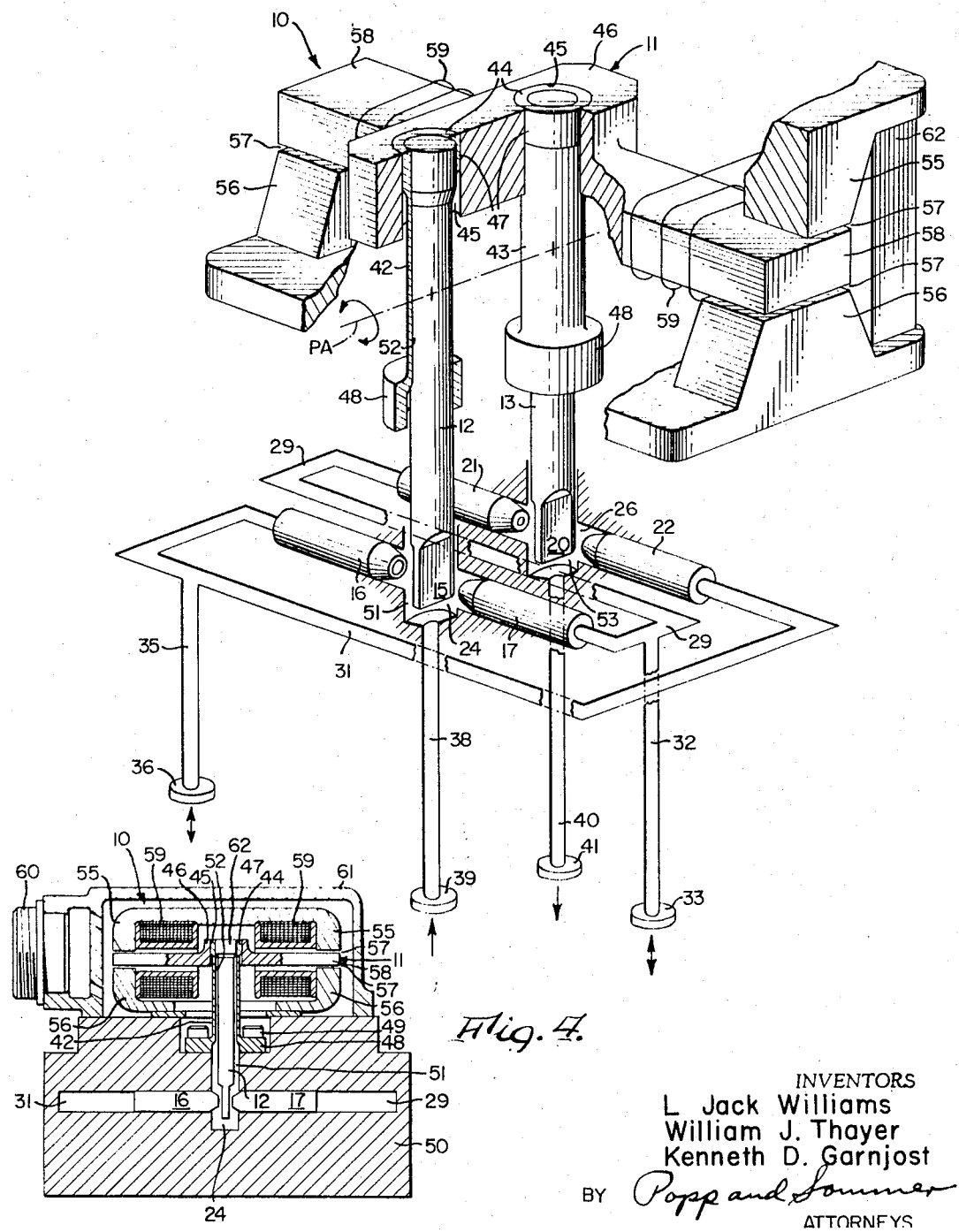

STATIC PERFORMANCE CHARACTERISTICS OF INVENTION

United States Patent Office 3,455,330
Patented July 15, 1969

3,455,330
SINGLE-STAGE PROPORTIONAL CONTROL SERVOVALVE
L Jack Williams and William J. Thayer, East Aurora, and Kenneth D. Garnjost, Buffalo, N.Y., assignors to Moog Inc., East Aurora, N.Y., a corporation of New York
Filed May 10, 1966, Ser. No. 548,995
Int. Cl. F17d 1/00
U.S. Cl. 137—596                                           12 Claims

ABSTRACT OF THE DISCLOSURE

A servovalve is disclosed which has receptor nozzle-flapper means for providing upstream variable orifices supplied with pressurized fluid, and downstream orifices connected to fluid return, the upstream and downstream orifices being arranged to produce therebetween a fluid differential pressure adapted to be applied to a load, the upstream orifices being variable in response to flapper motions resulting from input forces from an electrical force motor and positive pressure feedback forces created by differential controlled pressure acting over the frontal areas of the receptor nozzles.

---

This invention relates to an improved single-stage proportional control servovalve.

Various types of single-stage proportional control servovalves are known. The most common type is the closed-center spool and sleeve type with a direct torque motor drive to the valving element. Since this type of single-stage servovalve generally has poor resolution, dynamic characteristics and contamination susceptibility, it has been replaced by the two-stage servovalve on most high-performance hydraulic control systems.

Conventional two-stage proportional control servovalves utilize a closed-center spool and sleeve type output stage. The static output characteristics of this type of servovalve include useful flow output that can be much higher than the null leakage flow (i.e., the flow necessary for the servovalve first-stage together with the leakage past the spool in the centered position), high pressure gain through null so that full system pressure can be applied to the load at some input less than rated input, and load-flow effects which are square root and similar to a variable orifice in series with the load. Such characteristics are desirable from the system performance point of view.

Since the aforementioned common type of known single-stage servovalve having the direct torque motor drive to the valving element has not met the performance or environmental rigors of modern control systems, two other basic configurations of such valves have been developed, one being a nozzle-flapper servovalve and the other being a jet-pipe servovalve. For the most part, the performances of these nozzle-flapper and jet-pipe types of single-stage proportional control servovalves are satisfactory for the requirements of some control systems and are well suited to a relatively low power application. However, both such designs are inherently open-center and are subject to curious flow reaction forces which become more severe as the designs are scaled up where larger power outputs are desired.

If it is assumed that a large torque motor is used so that flow reaction forces are less significant, then the input current produces essentially proportional flapper position. This results in static characteristics for a conventional nozzle-flapper type of single-stage servovalve which include useful flow that, at best, is one-half of the leakage flow, leakage flow that is essentially constant for all signal input conditions, pressure gain that is relatively low and reaches a maximum (usually 80% of supply pressure) at rated input, and load-flow effects which reflect an open-center valve and simulate orifices in series and in parallel with the load. These characteristics are not as desirable from the control system point of view and whether or not they can be tolerated depends upon system requirements.

Generally speaking, a single-stage servovalve has advantages in some applications over a two-stage servovalve, these including improved reliability since friction problems from a sliding spool are eliminated, better dynamic response again because of the absence of a valve spool, better suitability to controlling very low flow rates because smaller areas of the valving orifices in a single-stage servovalve can be produced more practically than the areas of metering orifices achieved in a two-stage servovalve by narrow slots movable relative to the valve spool lobes.

From a control system point of view, dynamic stability criteria dictate the maximum value for loop gain which is related to the servovalve static flow gain. Accuracy of the system usually depends upon how much force an incremental error signal can develop. Accordingly, the combined requirement of stability and accuracy indicates that the ratio of force gain or blocked load pressure gain to the position loop gain or flow gain should be large.

For the normal closed-center spool type servovalve the ratio of pressure gain to flow gain ranges from 30 to 80. From a purely theoretical point of view, for an open-center servovalve having an orifice bridge in which four orifices are varied simultaneously, the theoretical top limit of the ratio of pressure gain to flow gain is 2; and if the orifice bridge contains two fixed and two variable orifices, the ratio of pressure gain to flow gain is theoretically limited to 1.

Such properties greatly reduce the number of suitable single-stage servovalve applications. Power piston areas must be increased to offset the power pressure gain in order to maintain system accuracy, then the required load flow must increase proportionally to maintain the piston velocity. This higher flow single-stage servovalve requires a larger torque motor such that the servovalve often becomes larger and heavier than the equivalent two-stage servovalve. The pump situation servicing the servovalve is usually worse. Not only have the flow requirements increased, but now the pump must be capable of supplying approximately twice the useful load flow to the servovalve. Thus, system size and weight usually become unreasonable and negate any advantage that might be obtained with a single-stage unit.

However, the single-stage proportional control servovalve of the present invention avoids this problem, while maintaining the desirable performance and reliability features inherent in the single-stage approach.

It is known to those skilled in the art that with a single nozzle discharging fluid against a flapper, the fluid-induced force acting to push the flapper away from the nozzle increases as the flapper is moved to increase flow, even if the nozzle pressure does not change. With two opposed nozzles arranged on opposite sides of a flapper as in a conventional single-stage servovalve of the nozzle-flapper type, the net fluid-induced force acts on the flapper as a decentering spring rate under no-load conditions. Curious nonlinearities near nozzle shut-off have the effect of nearly tripling the decentering force gradient over that predicted by theory. Consequently, the torque motor of a conventional single-stage servovalve of the nozzle-flapper type must overcome significant decentering flow reaction forces.

When the load is blocked such that there is no flow to the load, a differential pressure is developed between the nozzles which acts as a centering force on the flapper.

This phenomenon has the effect of reducing the ratio of pressure gain to flow gain of the servovalve below the values previously considered where the flow forces were neglected. If a single-stage servovalve were built with a mechanical centering spring just equal to the decentering no-load flow force gradient, high flows could be controlled with low torque inputs. However, such a valve could not build up a differential nozzle pressure to overcome actuator friction or external load force effects, with the result that the system would have no effective force gain and the ratio of pressure gain to flow gain would be low. From this it will be seen that small torque motors can be used to control relatively high no-load output flows, but torque motor requirements increase rapidly when the system demands the development of a force to overcome a blocked load.

Accordingly, there is room for improvement in the art of single-stage servovalves with respect to increasing pressure gain or the ratio of pressure gain to flow gain so that system accuracy can be maintained without unreasonably large power piston area, to improving force compensation so that large torque motors are not required, and to improving efficiency of power transfer so that supply demands are not twice useful output power.

The single-stage proportional control servovalve of the present invention meets these objectives. While physically such a servovalve bears a similarity to a conventional nozzle-flapper type single-stage servovalve, the key difference is the use of another nozzle-flapper in place of the two fixed orifices of the prior art servovalve so as to provide four variable orifices. The two flappers are driven in unison by a single torque motor.

An important object of the present invention is to provide a single-stage proportional control servovalve without the use of a sliding spool which achieves full flow recovery, so that the entire supply flow into the servovalve can be directed to the load. Because of this characteristic, such a single-stage servovalve is more efficient than a conventional open-center single-stage servovalve. Such a single-stage servovalve is also more efficient than a two-stage servovalve for applications where the load flow requirements aree less than twice the null leakage flow of a two-stage servovalve.

Another important and outstanding advantage of the present invention is to provide such a servovalve which has a substantial improvement in performance achieved by the introduction of positive pressure feedback. The significance of this can be appreciated by recalling that differential nozzle pressures create a large centering spring effect so that the torque motor has to overcome the combination of mechanical and pressure spring rates for blocked load conditions. If the effects of the load differential pressure are arranged so that a decentering spring gradient is created, this can be used to offset the normal centering spring effects. This is accomplished with the inventive servovalve resulting in drastic reductions in the torque motor size required as compared to conventional single-stage servovalves. The net positive centering effect need be only large enough to maintain a net negative slope of the load-flow characteristics.

Thus, maximum blocked load pressure differentials can be achieved with lower than rated torque levels. In other words, large pressure differentials can be developed with small signal inputs, whereas rated input is required to generate rated no-load flow. This is precisely the desirable characteristic of two-stage closed-center servovalves which is lost when conventional single-stage open-center servovalves are considered.

Another object of the invention is to provide such a servovalve, the performance of which is not adversely affected by pressure variations either in supply pressure or in load pressure.

Other objects and advantages of the present invention will be apparent from the following detailed description taken in conjunction with the accompanying drawings wherein:

FIG. 3 is a perspective view, essentially schematic but with some parts broken away, of the servovalve shown in FIG. 1.

FIG. 4 is a longitudinal sectional view, on a reduced scale, of a servovalve which operates in a manner similar to that of the servovalve schematically illustrated in FIGS. 1 and 3.

Figure 1:
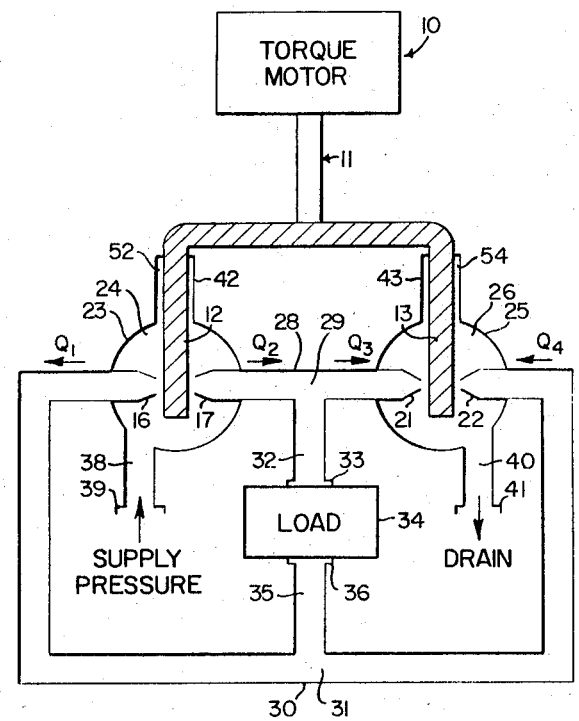
FIG. 1 is a schematic view of a single-stage proportional control servovalve constructed in accordance with the principles of the present invention.

The inventive single-stage proportional control servovalve comprises a polarized electrical force or torque motor 10 which includes a movable armature 11 to which two flappers 12 and 13, arranged side by side but spaced from each other, are rigidly connected so as to be movable therewith. This provides a rigid armature-flapper member movable as a unitary structure. The tips of these flappers are flattened and each is shown associated with a pair of nozzles. Thus, as best shown in FIG. 2, the tip of left movable flapper 12 has opposite and parallel flat sides 14 and 15 severally opposed by and spaced from two coaxially arranged stationary or fixed nozzles 16 and 17, respectively; and the tip of right movable flapper 13 has opposite and parallel flat sides 19 and 20 similarly spaced, respectively, from the ends of a pair of coaxially arranged stationary or fixed nozzles 21 and 22.

Figure 2:
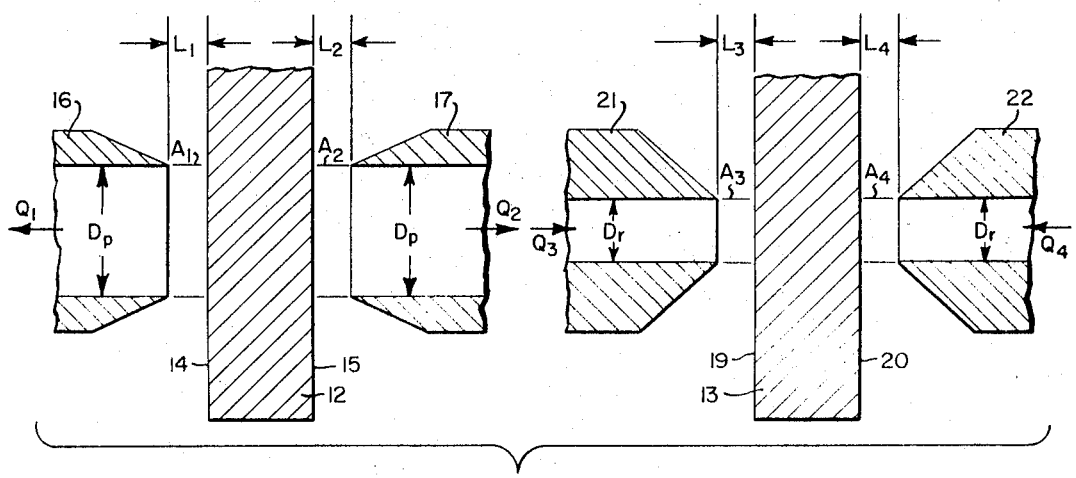
FIG. 2 is a greatly enlarged fragmentary view of the four nozzles and split flapper shown in FIG. 1.

The space betweeen surface 14 and the end or tip of nozzle 16 is represented in FIG. 2 by the dimension $L_1$, the similar spacing between surface 15 and nozzle 17 by $L_2$, the similar spacing between surface 19 and nozzle 21 by $L_3$, and the similar spacing between surface 20 and nozzle 22 by $L_4$. Each of nozzles 16 and 17 is shown as provided with a cylindrical bore having a diameter represented by the dimension $D_p$, while each of nozzles 21 and 22 is shown as provided with a cylindrical bore having an effective diameter represented by the dimension $D_r$. Thus $\pi D_p L_1$ provides a circumferential area represented by $A_1$; $A_2$ represents a similar circumferential area determined by $\pi D_p L_2$; $A_3$ represents a similar circumferential area determined by $\pi D_r L_3$; and $A_4$ represents a similar circumferential area represented by $\pi D_r L_4$. These areas $A_1$, $A_2$, $A_3$ and $A_4$ are variable orifice areas determined in size severally by the position of the coresponding flapper 12 or 13 with respect to the nozzlesc 16, 17, 21 and 22.

Referring to FIG. 1, means 23 shown schematically akin to a vessal provides a flapper chamber 24 communicable with the interiors of nozzles 16 and 17 through areas $A_1$ and $A_2$. Similar means 25 provides another flapper chamber 26 communicable with the interior of the nozzles 21 and 22 through orifice areas $A_3$ and $A_4$. Thus chambers 24 and 26 might also be regarded as area chambers.

Means 28 shown in FIG. 1 schematically akin to a conduit provides a nozzle chamber 29 connecting the interior or bore of nozzle 17 with that of nozzle 21. Similar means 30 provides another nozzle chamber 31 which connects the interior or bore of nozzle 16 with that of nozzle 22.

Means 32 shown in FIG. 1 schematically akin to a conduit connects nozzle chamber 29 in fluid conducting communication with with an actuating port 33 for a load such as a cylinder and piston represented schematically at 34. Similar means 35 connects the other nozzle chamber 31 to another actuating port 36 on the other side of load 34.

Also in FIG. 1, means 38 represents an inlet conduit extending between a pressure port 39 and chamber 24 to constitute a means for connecting such chamber to a supply of pressurized fluid (not shown). Means 40 represents an outlet conduit extending between a return port 41 and chamber 26 to constitute a means for connecting the other flapper chamber 26 to a fluid drain (not shown).

The armature-flapper members provided by the rigidly connected elements 11, 12 and 13 is mounted for pivotal movement frictionlessly on a pair of flexure tubes 42 and 43 severally surrounding the upper portions of flappers 12 and 13, respectively. The pivotal axis is intermediate the lengths of these flexure tubes and extends transversely thereof, being represented by the line PA in FIG. 3.

The upper end of each flexure tube 42 and 43 is shown as enlarged to provide a collar 44 which sealingly plugs a hole 45 provided in an enlarged central portion 46 of armature 11. The upper end portion of each of flappers 12 and 13 is enlarged as indicated at 47 and sealingly plugs the bore of the upper end of the corresponding flexure tube. The lower end portion of each flexure tube is also shown as enlarged to provide an annular attaching flange 48 which is suitably secured, as by attaching screws 49 secured to a body member 50 as shown in FIG. 4. This body member is provided with a recess 51 which jointly with an annular clearance 52 between flapper 12 and flexure tube 42 provide the flapper or area chamber 24. A similar recess 53 in body member 50 jointly with the similar annular clearance 54 between flapper 13 and flexure tube 43 (FIG. 1) provides the other flapper or area chamber 26.

Body member 50 is actualy drilled to form communicating passages which provide the chamber 29 connecting nozzle 17 and 21, and also with suitable pasages providing the chamber 31 connecting nozzles 16 and 22. Likewise, body member 50 actually has drilled holes to provide the passages 32, 35, 38 and 40 and these holes are counterbored at their outer ends to provide the ports 33, 36, 39 and 41 in the base of the body member. Further, in actual practice, body member 50 will also house filter means (not shown) for filtering fluid flowing through the various passages.

The polarized torque motor 10 is shown as also including upper and lower pole pieces 55 and 56, respectively, which are spaced apart to provide a pair of air gaps 57. In these air gaps the ends of the wing portions 58 of armature 11 are movably arranged. Each such wing portion is surrounded by a coil 59 constituting electromagnetic means adapted to receive a command signal input through an electrical connector 60 shown in FIG. 4 carried by cap 61 for the motor 10. Permanent magnet means indicated at 62 are also operatively arranged between pole pieces 55 and 56.

When torque motor 10 has no electrical signal input, flappers 12 and 13 are in a null or centered position, as shown in FIGS. 1 and 2. In this null position orifice area $A_1$ equals orifice area $A_2$, and orifice area $A_3$ equals orifice area $A_4$. Nozzles 16 and 17 serve as inflow nozzles severally handling the flows $Q_1$ and $Q_2$, respectively, of fluid admitted into area chamber 24 through inlet conduit 38 from supply; while nozzles 21 and 22 serve as outflow nozzles severally handling the flows $Q_3$ and $Q_4$, respectively, of fluid discharged from area chamber 26 through outlet conduit 40 to drain. Since all of these flows are equal through nozzle chambers 29 and 31, there is no flow through load conduits 32 and 35 with respect to load 34.

Now assume that torque motor 10 receives a command signal of such a polarity as to pivot the armature-flapper member 11-13 in a clockwise direction about axis PA whereby the tips of flappers 12 and 13 move to the left in unison. Oriface areas $A_1$ and $A_2$ are now differentially varied with $A_1$ decreasing and $A_2$ increasing. Similarly and simultaneously, orifice areas $A_3$ and $A_4$ are differentially varied with $A_3$ decreasing and $A_4$ increasing. As a consequence flows $Q_2$ and $Q_4$ increase while flows $Q_1$ and $Q_3$ decrease, and there occurs a net flow toward load 34 through conduit 32 and, provided the load freely moves (i.e., no-load), a similar net flow away from the load through conduit 35. If the load hesitates, or is blocked then fluid pressure in connected nozzle chamber 29 and load conduit 32 is increased, while fluid pressure in connected nozzle chamber 31 and load conduit 35 is decreased, producing a pressure differential across load 34 to drive it.

If, on the other hand, torque motor 10 receives a command signal of the opposite polarity so as to pivot the armature-flapper member in counterclockwise direction about axis PA, the tips of flappers 12 and 13 move to the right in unison. Oriffice areas $A_1$ and $A_3$ increase and hence flows $Q_1$ and $Q_3$ increase, while orifice areas $A_2$ and $A_4$ decrease with a decrease also in flows $Q_2$ and $Q_4$. There is now an increase in pressure in nozzle chamber 31 and a decrease in pressure in nozzle chamber 29, and a net flow toward load 34 through conduit 35 and away from load through conduit 32.

The pressure differential across load, and the flow to the load are proportional in magnitude and polarity to the command signal input.

An important feature of the inventive single-stage proportional control valve is that a deliberate mismatching of pressure forces on the flappers of the armature-flapper member can be produced in a predetermined manner to provide positive pressure feedback, i.e. a fluid-induced force on the flappers which aids rather than opposes the armature displacement commanded by the signal input. In the arrangement illustrated, if nozzles 16 and 17 are incrementally larger by a calculated amount than nozzles 21 and 22, as indicated by the difference between diameters $D_p$ and $D_r$ depicted in FIG. 2, then there will result a slight unbalance in pressure forces acting upon flappers 12 and 13. For example, assuming that the polarity and signal input to the torque motor to be such that flappers 12 and 13 move to the left as viewed in FIG. 2, this tends to increase the load pressure in nozzle chamber 29 connecting nozzles 17 and 21. This increased pressure produces a higher clockwise torque from nozzle 17 on left flapper 12 than is offset by the torque developed by nozzle 21 on right flapper 13, as $D_p$ is larger than $D_r$. This aids signal input torque and hence produces positive pressure feedback.

Similarly, if the polarity and signal input is such as to move flappers 12 and 13 to the right as viewed in FIG. 2, the load pressure in nozzle chamber 31 connecting nozzles 16 and 22 will increase producing a higher counterclockwise torque from nozzle 16 on left flapper 12 than is offset by the torque developed by nozzle 22 on right flapper 13. This again aids the signal input torque, producing positive pressure feedback.

By selecting the proper amount of mismatch between the effective cross-sectional areas of the pairs of nozzles, the desired degree of pressure gain can be predetermined. In this connection, it is pointed out that the ejector nozzles, which are nozzles 21 and 22 in the form of the invention illustrated, must have an effective cross-sectional flow area smaller than that of each of the receptor nozzles, which are nozzles 16 and 17 in the embodiment illustrated.

From the foregoing, it will be seen that the inventive servovalve has a supply pressure chamber 24, a pair of controlled pressure chambers 29 and 31, a return pressure chamber 26, means including a pair of receptor nozzles 16 and 17 and a resiliently supported flapper 12 to provide a pair of upstream orifices which establish communication between chamber 24 and chambers 29 and 31 severally, and means including a pair of ejector nozzles 21 and 22 and a second flapper 13 connected to flapper 12 to provide a pair of downstream orifices which establish communication between chambers 29 and 31 severally and chamber 26, all of these orifices being variable in response to flapper motions resulting from input forces and positive pressure feedback forces created by differential controlled pressure acting over the frontal areas of receptor nozzles 16 and 17 and negative pressure feedback forces created by such differential controlled pressure acting over the frontal areas of ejector nozzles 21 and 22. This differential controlled pressure is the difference between the pressures in chambers 29 and 31 and is an output pressure, variable between zero and a finite value of either polarity, available to drive the load 34. The frontal area of each of receptor nozzles 16 and 17 is the end area of its bore, $\pi D_p^2/4$; whereas the frontal area of each of ejector nozzles is the end area of its bore, $\pi D_r^2/4$. If the input force to flapper 12 urges it to move in a clockwise direction, the pressure in chamber 29 will increase over that in 31 and there is a net torque on flapper 12 as a result of this differential controlled pressure acting over the frontal areas of receptor nozzles 16 and 17 which will be also a clockwise torque, thus aiding the input torque with regard to moving flapper 12 and this is positive pressure feedback. Under this same condition of assumed clockwise input torque, there is a net torque on flapper 13 as a result of this same differential controlled pressure acting over the frontal areas of ejector nozzles 21 and 22 which will be in a counterclockwise direction, thus opposing the input torque with regard to moving flapper 13 and this is the conventional negative pressure feedback effect.

It is apparent that the load 34 could be connected across ports 39 and 41 and that supply and return could be connected to ports 33 and 36. If, for example, nozzle chamber 29 were connected to the supply of pressurized fluid and the other nozzle chamber 31 were connected to fluid drain, then the ejector nozzles would be nozzles 17 and 21 and these would be smaller than the receptor nozzles, now nozzles 16 and 22, if the feature of positive pressure feedback were to be achieved.

Figure 5:
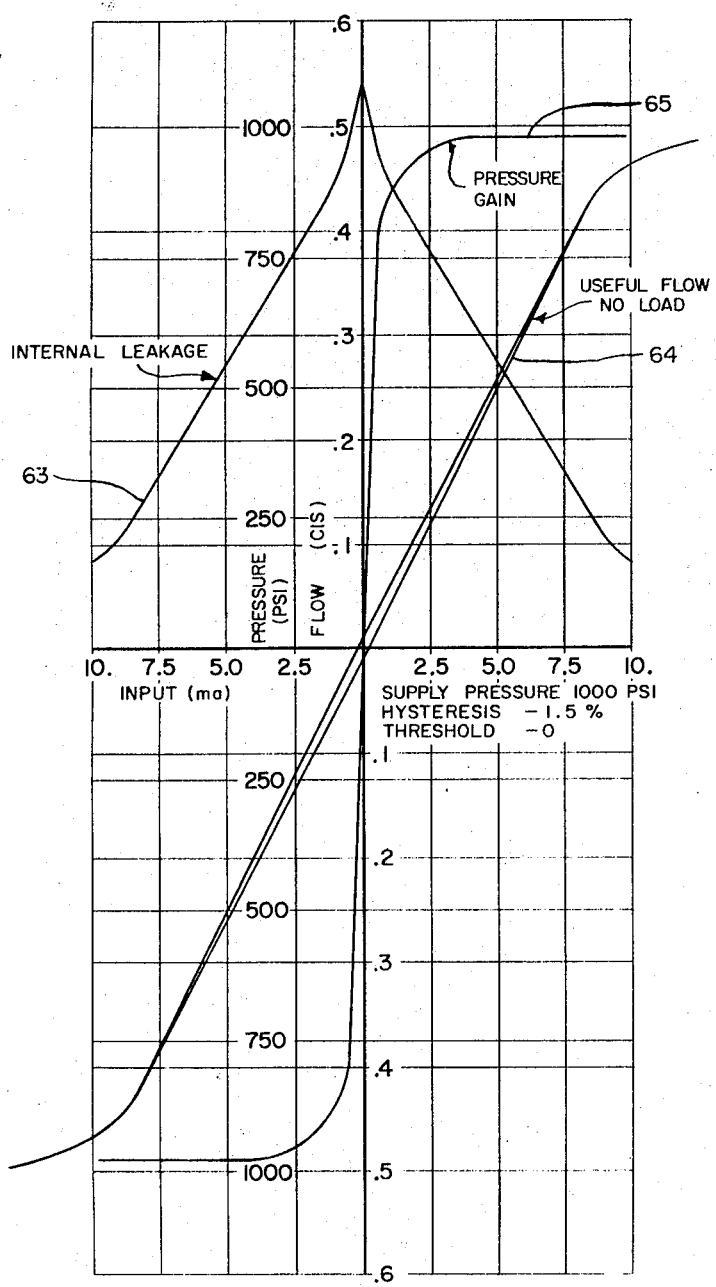
FIG. 5 is a plot of certain performance characteristics of the servovalve shown in FIGS. 1–4.

The performance characteristics of a typical four variable orifice single-stage proportional control servovalve of the type illustrated is depicted in FIG. 5 in which line 63 represents internal leakage (that is, supply flow which is not directed to the load), line 64 represents useful flow under no-load conditions, and line 65 represents pressure gain under blocked load conditions.

The arrangement of the invention specifically illustrated whereby in a null position flappers 12 and 13 are arranged centrally between and are spaced from their associated nozzles so that there is flow through orifice areas $A_1$, $A_2$, $A_3$, and $A_4$, provides an open-center single-stage servovalve. All of the advantages of such a servovalve, except positive pressure feedback, can be similarly achieved with a single-stage servovalve in which the orifice areas are normally closed, but this requires a specifically different arrangement of nozzles such as each pair of nozzles being arranged side by side facing the movable end of its associated flapper, so as to create variable shear orifices.

Inasmuch as changes and modifications may readily occur to those skilled in the art without departing from the spirit of the invention, the embodiment shown in the drawings and described is illustrative and not limitative of the invention the scope of which is to be measured by the appended claims.

What is claimed is:

1. A single-stage servovalve, comprising a polarized torque motor including a movable armature, first and second flappers rigidly connected together and to said armature, first and second nozzles associated with said first flapper, third and fourth nozzles associated with said second flapper, movement of said armature in one direction causing said first flapper to increase the effective opening of one of said first and second nozzles while causing said second flapper to increase the effective opening of one of said third and fourth nozzles, movement of said armature in the other direction causing said first flapper to increase the effective opening of the other of said first and second nozzles while causing said second flapper to increase the effective opening of the other of said third and fourth nozzles, means providing a first flapper chamber communicable with said first and second nozzles, means providing a second flapper chamber communicable with said third and fourth nozzles, means providing a first nozzle chamber connecting said one of said first and second nozzles with said other of said third and fourth nozzles, means providing a second nozzle chamber connecting said other of said first and second nozzles with said one of said third and fourth nozzles, means for connecting one of said first chambers to a supply of pressurized fluid, means for connecting the other of said first chambers to an actuating port, means for connecting to a fluid drain that one of said second chambers of a type similar to said one of said first chambers, and means for connecting the other of said second chambers to another actuating port.

2. A servovalve as defined in claim 1 wherein means are provided for isolating fluid in said flapper chambers from said motor.

3. A servovalve as defined in claim 2 wherein said isolating means includes a flexure tube for each of said flappers, such flexure tubes jointly mounting said flappers and armature for pivotal movement.

4. A servovalve as defined in claim 3 wherein said flappers are arranged side by side, and said armature has wing portions extending laterally from opposite sides of said flappers.

5. A single-stage servovalve, comprising a polarized torque motor including an armature, first and second flappers rigidly connected together and to said armature, first and second nozzles associated with said first flapper to provide differentially variable first and second orifice areas, third and fourth nozzles associated with said second flapper to provide differentially variable second and third orifice areas, means connecting said first and second areas to provide a first area chamber, means connecting said third and fourth areas to provide a second area chamber, means connecting said first and fourth nozzles to provide a first nozzle chamber, means connecting said second and third nozzles to provide a second nozzle chamber, means for connecting one of said first chambers to a supply of pressurized fluid, means for connecting the other of said first chambers to an actuating port, means for connecting to a fluid drain that one of said second chambers of a type similar to said one of said first chambers, and means for connecting the other of said second chambers to another actuating port.

6. A servovalve as defined in claim 5 wherein means are provided for isolating fluid in said area chambers from said motor.

7. A servovalve as defined in claim 6 wherein said isolating means includes a flexure tube for each of said flappers, such flexure tubes jointly mounting said flappers and armature for pivotal movement.

8. A servovalve as defined in claim 7 wherein said flappers are arranged side by side, and said armature has wing portions extending laterally from opposite sides of said flappers.

9. A servovalve as defined in claim 5 wherein two of said nozzles are ejector nozzles and the other two are receptor nozzles, and each of said ejector nozzles has an effective cross-sectional flow area smaller than that of each of said receptor nozzles.

10. A servovalve as defined in claim 5 wherein said first area chamber is connected to said supply, said second area chamber is connected to said drain, said nozzle chambers severally are connected to said ports, and each of said third and fourth nozzles has an effective cross-sectional flow area smaller than that of each of said first and second nozzles.

11. In a servovalve, the combination comprising means providing a supply pressure chamber, controlled pressure chambers and a return pressure chamber, means including receptor nozzles and a resiliently supported first flapper providing upstream orifices establishing communication between said supply pressure chamber and said controlled pressure chambers severally, means including ejector nozzles and a second flapper rigidly connected to said first flapper providing downstream orifices establishing communication between said controlled pressure chambers severally and said return pressure chamber, and an electrical force motor arranged to drive said flappers in unison, all of said orifices being variable in response to flapper motions resulting from input forces from said motor and positive pressure feedback forces created by differential controlled pressure acting over the frontal areas of said receptor nozzles and negative pressure feedback forces created by said differential controlled pressure acting over the frontal areas of said ejector nozzles.

12. In a servovalve, the combination comprising means providing a supply pressure chamber, controlled pressure chambers and a return pressure chamber, means including receptor nozzles and a resiliently and frictionlessly supported flapper providing upstream orifices establishing communication between said supply pressure chamber and said controlled pressure chambers severally, an electrical force motor arranged to drive said flapper, and means providing downstream orifices establishing communication between said controlled pressure chambers severally and said return pressure chamber, said upstream orifices being variable in response to flapper motions resulting from the frictionless summing of input forces from said motor with positive pressure feedback forces created by differential controlled pressure acting over the frontal areas of said receptor nozzles, together with forces due to the resilient support of the flapper.

References Cited

UNITED STATES PATENTS

| | | | |
|---|---|---|---|
| 3,260,273 | 7/1966 | Hayner | 137—625.64 |
| 2,725,077 | 11/1955 | Nicholl | 137—625.64 |
| 2,775,254 | 12/1956 | Stanbury | 137—82 |
| 2,853,090 | 9/1958 | Hanna et al. | 137—82 |
| 2,881,740 | 4/1959 | Ensinger. | |
| 2,939,430 | 6/1960 | Westbury | 137—625.62 XR |

M. CARY NELSON, Primary Examiner

R. J. MILLER, Assistant Examiner

U.S. Cl. X.R.

137—625.62